United States Patent [19]

Nakamura

[11] Patent Number: 4,916,967
[45] Date of Patent: Apr. 17, 1990

[54] THROTTLE OPERATING DEVICE FOR JET-PROPELLED SMALL-SIZED BOATS

[76] Inventor: Yukio Nakamura, 5-6, 1 Chome, Tengachayakita, Nishinari-Ku, Osaka-Shi, Osaka-Fu, Japan

[21] Appl. No.: 356,318

[22] Filed: May 24, 1989

[30] Foreign Application Priority Data

Jan. 31, 1989 [JP] Japan .................................. 64-3316
Feb. 6, 1989 [JP] Japan .................................. 64-13456

[51] Int. Cl.⁴ .......................... F16C 1/10; G05G 11/00
[52] U.S. Cl. ............................ 74/502.2; 74/483; 74/526
[58] Field of Search ................ 74/488, 489, 475, 526, 74/527, 500.5, 502.2; 188/2 D, 24.18, 24.19, 24.22, 24.12; 192/13 R, 13 A

[56] References Cited

U.S. PATENT DOCUMENTS

| | | | |
|---|---|---|---|
| 4,019,402 | 4/1977 | Leonhart | 74/489 |
| 4,088,040 | 5/1978 | Ross-Myring | 74/500.5 X |
| 4,149,432 | 4/1979 | Costahaude | 74/489 |
| 4,263,818 | 4/1981 | Ozaki | 74/489 |
| 4,308,761 | 1/1982 | Shimano | 74/489 |
| 4,667,785 | 5/1987 | Toyoda et al. | 192/13 A |
| 4,674,353 | 6/1987 | Yoshigai | 74/500.5 X |
| 4,679,460 | 7/1987 | Yoshigai | 74/489 |
| 4,745,872 | 5/1988 | Nakamura | 74/479 |
| 4,748,928 | 6/1988 | Nakamura | 74/479 X |
| 4,759,230 | 7/1988 | Nagano | 188/24.12 X |
| 4,785,683 | 11/1988 | Buckley et al. | 74/502.2 X |
| 4,819,497 | 4/1989 | Romano | 74/489 |

FOREIGN PATENT DOCUMENTS

| | | | |
|---|---|---|---|
| 2434300 | 1/1976 | Fed. Rep. of Germany | 74/489 |
| 1053166 | 2/1954 | France | 74/489 |
| 2138924 | 10/1984 | United Kingdom | 74/502.2 |

Primary Examiner—Vinh T. Luong
Attorney, Agent, or Firm—Armstrong, Nikaido Marmelstein, Kobovcik & Murray

[57] ABSTRACT

The present invention provides a throttle operating device for jet-propelled small-sized boats comprising an attaching bracket integrally fixed to the steering handle lever of a boat body, and a throttle operating lever pivotally connected to the bracket through a pivot pin so that it can be raised and lowered, characterized in that:

the attaching bracket for the throttle operating lever is bisected into a pair of bracket segments which can be clamp-wise fixed to the handle bar, thereby making it possible to replace the operating lever and mount a new one on the handle bar easily without having to extract the grip cover from the handle bar, the operating lever is in the shape of the Japanese character "Λ" as seen in side view with its hand rest and attaching leg forming an acute angle, which is less than 90 degrees, the attaching leg being connected through a pivot pin to a lever support fork extending rearward from an intermediate height location on the attaching bracket, thereby reducing the radius of rotation of the operating lever so as to prevent undesirable deformation or bending of a throttle cable which is advanced and retracted by the operating lever, whereby severe acceleration control provided by the operation of the lever can be effectively applied to the engine.

3 Claims, 15 Drawing Sheets

THROTTLE OPERATING DEVICE FOR JET-PROPELLED SMALL-SIZED BOATS

BACKGROUND OF THE INVENTION

Generally, in jet-propelled small-sized boats adapted to glide freely over water surface, as disclosed, e.g., in my U.S. Pat. Nos. 4,745,872 and 4,748,928, a single person rides the boat in a standing posture on the floor deck of the boat with his hands gripping the steering handle bar to rotate it for steering so as to control a steering cable extending to the stern to swing the steering nozzle of a jet-propelling device (water jet pump) installed in the stern for steering the boat.

Also mounted on the steering handle bar is a throttle operating device for controlling the opening and closing of a throttle valve for a carburetor. In a conventional throttle operating device as shown in an elevation (side view) in FIG. 20, a bracket 72 for attaching a throttle operating lever 71 to said steering handle bar 70 is made from a light metal, such as aluminum, and formed by die-casting or cutting. Extending from the lower end of the bracket 72 is a clamp piece 74 formed with a diameter reducing slit 73, while a mast piece 76 formed with a threaded hole 75 extends from the upper end of the bracket 72. And screwed into the threaded hole 75 of said mast piece 76 is a mouth piece 78 which supports the cover tube 77 of a throttle cable C.

On the other hand, the throttle operating lever 71 is triangular as seen in side view, with its relatively short side being bifurcated and its remaining long side being bent substantially into inverted U shape to form a hand rest 82 which covers the grip cover 81 of the steering handle bar 70. A locking block 83 for the throttle cable C is locked in the bent boundary between the attaching legs 80 and hand rest 82 which form an obtuse angle $\alpha$ therebetween. The numeral 84 denotes seats for the locking block 83, and 85 denotes a notch for insertion of the throttle cable C.

As shown in FIGS. 21 and 22, said attaching bracket 72 is fitted on the steering handle bar 70 and then fixed to the latter by a fixing bolt 86 extending transversely through the clamp piece 74, while the attaching legs 80 of the throttle operating lever 71 are joined to the bracket 72 by a pivot pin 87 inserted in the clamp piece 74 of the attaching bracket 72, said pivot pin 87 transversely extending in parallel with said fixing bolt 86, whereby the operating lever 71 can be turned to rise and fall around the axis of the pivot pin 87. Through the lever operation by hand, the throttle cable C is moved back and forth longitudinally of the boat, so that the throttle valve of the carburetor is suitably controlled for opening and closing.

With the conventional arrangement described above, however, first, the attaching bracket 72 is fitted on the steering handle bar 70; thus, when it is desired to replace the throttle operating lever 71, the operator would have to take the trouble to withdraw the grip cover 81 from the handle bar 70. This is very troublesome, obliging the operator to replace the whole handle bar 70.

Secondly, since the attaching legs 80 and hand rest 82 of the throttle operating lever 71 are bent relative to each other, forming an obtuse angle $\alpha$ and since the lower ends of the attaching legs 80 are joined to the clamp piece 74 extending from the lower end of the attaching bracket 72, the radius of rotation r of the operating lever 71 becomes unnecessarily long. As a result, when the operating lever 71 is fully turned to lie flat around the axis of the pivot pin 87 so as to be in close contact with the grip cover 71 of the handle bar 70 (i.e., when the throttle valve is fully opened), the throttle cable C comes in contact with the outlet of the mouth piece 78 and bends at a definite angle $\theta$, a fact which means that the throttle cable C cannot smoothly move back and forth in a straight line.

In that case, the throttle cable insertion guide notch 85 on the operating lever 71, as is clear from FIG. 20, opens downward and the seats 84 for the locking block 83, as shown in FIGS. 21 and 22, simply support the locking block 83 from below and open in the rear region; therefore, when the throttle cable C fails to smoothly return forward, the locking block 83 falls off the seats 84 on the operating lever 71. At any rate, severe acceleration control for the high performance engine cannot be effected.

Thirdly, since the tool for adjusting the rotation angle range of the operating lever 71 (the degree of opening of the throttle valve) is not furnished in the vicinity of the operating lever 71, it is necessary to adjust the effective length of the throttle cable C in advance at the place where it is connected to the engine; this adjustment is also a troublesome operation.

Further, because of said absence of the adjusting tool at hand, the fingers of one hand gripping the grip cover 81 on the handle bar 70 do not fit on the hand rest 82 of the operating lever 71 snugly and positively depending on the size of the operator's hand, making it difficult to apply smooth effective acceleration control.

Fourthly, since the attaching bracket 72 is made from a light metal, such as aluminum, by die-casting or cutting, it cannot be colored according to the operator's liking, nor can it be mass-produced. Further, it would rust or corrode owing to sea water. On the other hand, the throttle operating lever 71 is made from synthetic resin. However, since the hand rest 82 has an inverted U-shaped cross section, whose width dimension W is considerably large, as shown in FIG. 22, it is too large for an area to be contacted by the fingers of one hand. As a result, the fingers tend to slip off during lever operation.

SUMMARY OF THE INVENTION

The present invention has been accomplished to solve these problems, and a first object thereof is to provide an arrangement wherein the attaching bracket for the throttle operating lever is bisected into a pair of opposed bracket segments which are adapted to be fixed on the steering handle bar by clamping the latter therebetween from opposite sides, thereby eliminating the need for extracting the grip cover from the handle bar, while making it possible to attach and replace the operating lever as desired without hindrance.

A second object is to provide an arrangement wherein the throttle operating lever is made in the shape of the Japanese character " ∧ " as seen in side view so that the attaching leg and the hand rest are bent relative to each other to form an acute angle, which is less than 90 degrees, said attaching leg being fitted to a lever support fork extending from one of the bracket segments, said attaching legs being then turnably attached thereto by a pivot pin extending therethrough, thereby greatly reducing the radius of rotation to the extent that even when the hand rest of the operating lever is fully lowered to abut against the steering handle bar (i.e., even when the throttle valve is fully opened), the throttle cable is smoothly moved in a straight line rather than being forced to be bent into contact with something therearound.

A third object is to provide an arrangement wherein an adjusting bolt for positioning the operating lever is adjustably screwed from front into a support mast extending upward from one of the two bracket segments, the front end of the rear portion of the adjusting bolt exposed from the support mast being locked to the attaching leg of the throttle operating lever, thereby allowing the rotation angle range of the operating lever (the degree of opening of the throttle valve) to be adjusted and set in advance, so that anyone can fit the fingers of his one hand on the hand rest of the operating lever stably and positively.

A fourth object is to provide an arrangement wherein the throttle operating lever and the attaching bracket for the steering handle bar are injection-molded from a high strength thermoplastic resin (so-called engineering plastic) such as polyacetal or polycarbonate, thereby preventing rust formation and corrosion and enabling mass production and wherein particularly the width of the hand rest of the operating lever is reduced into a narrow bar form having a reduced area for engaging the fingers, so that anyone can put his hand thereon positively without the danger of the fingers slipping off.

Other objects will become apparent from the following detailed description of the arrangement of the invention and preferred embodiments thereof.

BRIEF DESCRIPTION OF THE DRAWINGS

FIGS. 4 and 5 are sectional views taken along the lines 4—4 and 5—5 in FIG. 3;

FIG. 6 is a sectional view taken along the line 6—6 in FIG. 4;

FIGS. 7 and 8 are a side view and a front view of one of the two bracket segments in the attaching bracket;

FIGS. 9 through 14 are a right-hand side view, a left-hand side view, a front view, a rear view, a plan view and a bottom view of the other bracket segment;

FIG. 15 is a sectional view taken along the line 15—15 in FIG. 9;

FIG. 16 a sectional view taken along the line 16—16 in FIG. 11;

FIG. 17 is a side view of the throttle operating lever, showing changes in cross section;

FIG. 18 is a fragmentary plan view of a throttle cable;

FIG. 19 is an enlarged sectional view of a modification corresponding to FIG. 4;

DETAILED DESCRIPTION OF THE PREFERRED EMBODIMENTS

Figure 1:
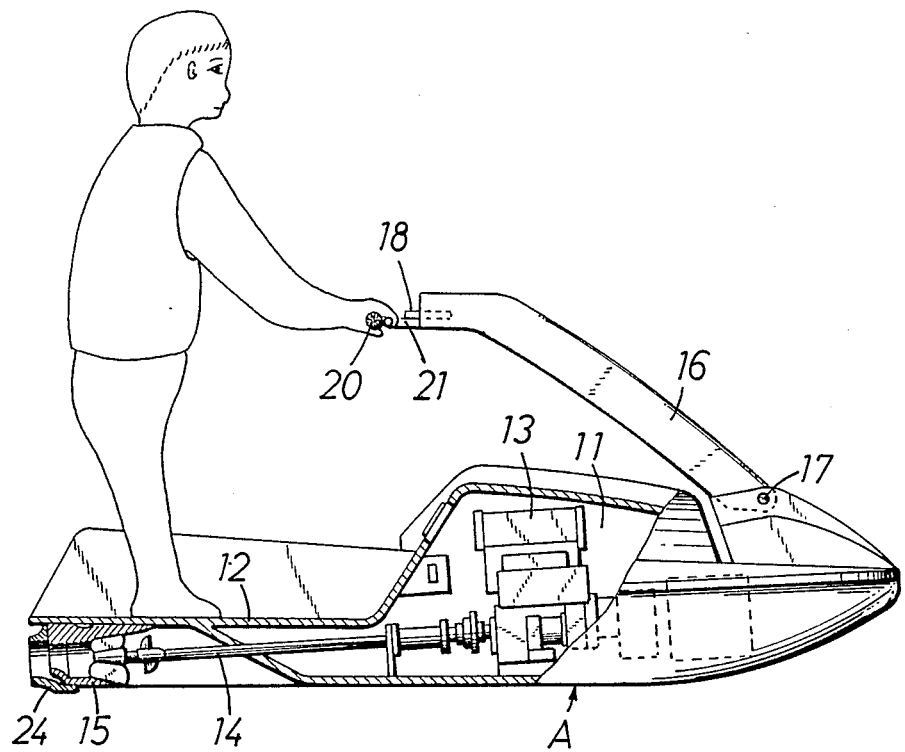
FIG. 1 is a complete schematic side view of a jet-propelled small-sized boat shown partly broken away.
Figure 2:
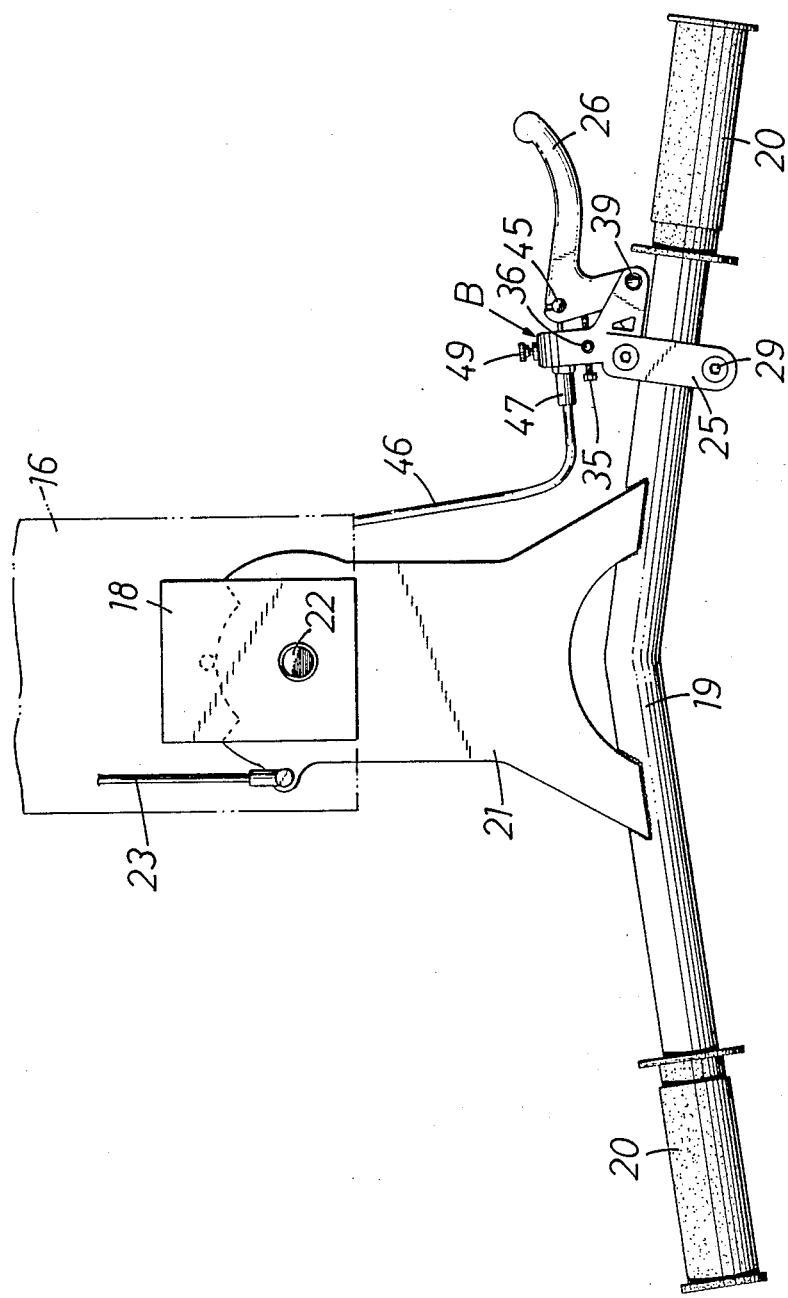
FIG. 2 is an enlarged plan view showing how an operating handle bar is attached to the handle pole of the boat.

The concrete arrangement of the present invention will now be described with reference to the accompanying drawings. In FIGS. 1 and 2 diagrammatically showing a jet-propelled small-sized boat, the character A collectively indicates a boat body of hollow hermetically sealed float construction made from fiber-reinforced plastic (FRP), the front half defining an engine room 11, the rear half defining a floor deck 12 on which the operator rides in a standing posture.

The numeral 13 denotes an engine installed in the engine room 11, said engine being used to drive a jet-propelling device (water jet pump) 15 through a propeller shaft 14 to impart a propelling force to the boat body A. The numeral 16 denotes a handle pole pivotally connected to the fore of the boat by a horizontal shaft 17 so that its rear upper portion can be raised and lowered, said rear upper portion, which overhangs the floor deck 12, having a steering handle bar attaching base disk 18 integrally fixed thereto in a lining fashion.

The numeral 19 denotes a steering handle bar; 20 denotes a pair of grip covers integrally fitted on the opposite ends of said steering handle bar; and 21 denotes an attaching plate extending integrally forward from the middle portion of the handle bar 19, said attaching plate being joined from below to the base disk 18 of the handle pole 16 and pivotally connected through a vertical shaft 22 so that it is turnable around the axis thereof.

The vertical shaft 22, as is clear from FIG. 2, lies in the center line extending in the direction of travel of the boat body A, and one end of a steering cable 23 is attached to the attaching plate at a position deviated to the left or right from said center line. It goes without saying that the other end of the steering cable 23 extends to the rear through the handle pole 16 and boat body A and is connected to a steering nozzle 24 belonging to the jet propelling device in the stern.

The character B collectively indicates a throttle operating device according to the invention, comprising a combination unit of an attaching bracket 25 to be attached to the steering handle bar 19 and a throttle operating lever 26, said components being injection-molded from polyacetal having such dynamic properties as a strength (tensile yield point) of 700 kg/cm$^2$, a break elongation of 45% and a flexural rigidity of 30,000 kg/cm$^2$, polycarbonate or other high strength thermoplastic synthetic resin (so-called engineering plastic) into the following forms.

Figure 7:
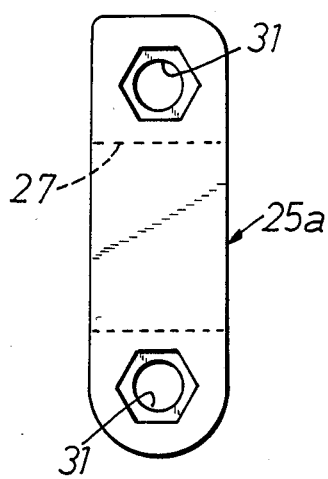
Figure 8:
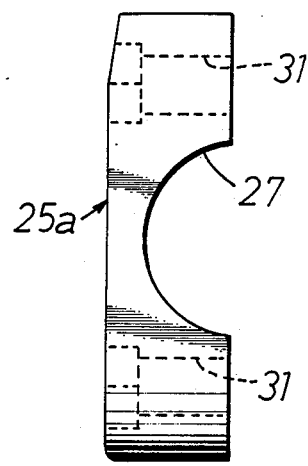
Figure 9:
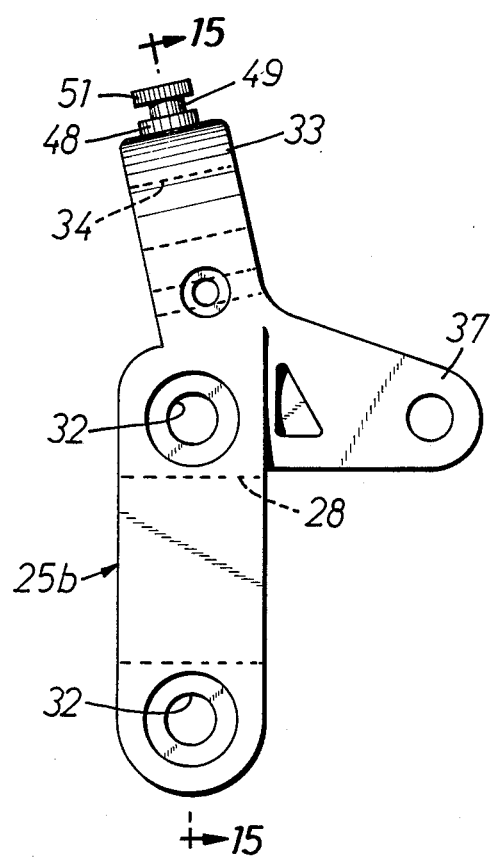
Figure 10:
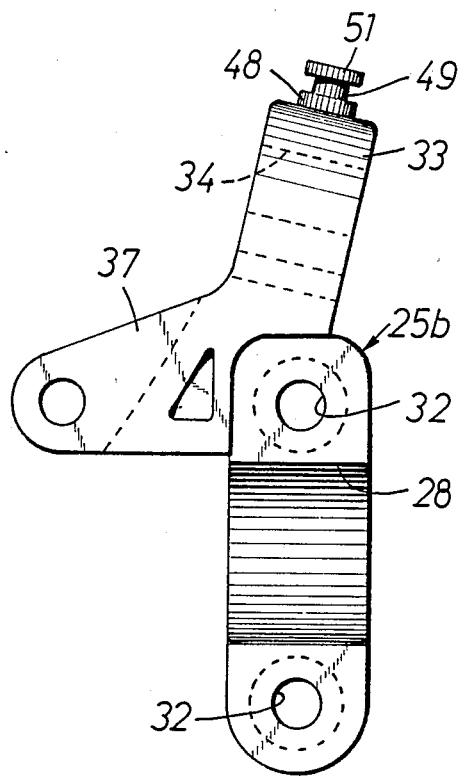
Figure 11:
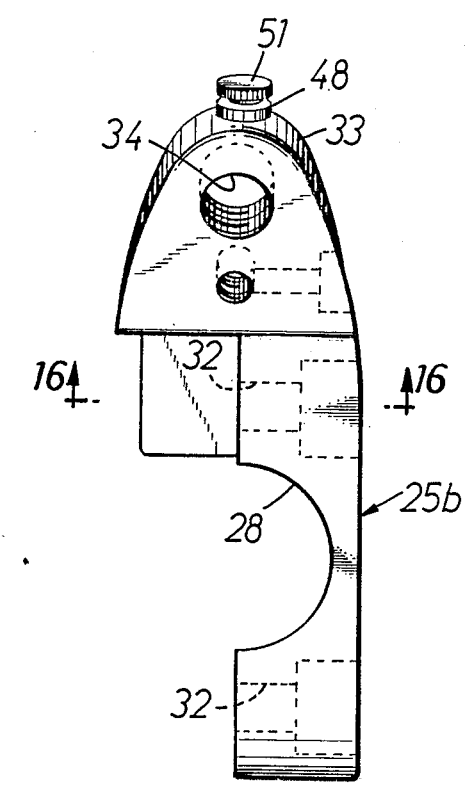
Figure 12:
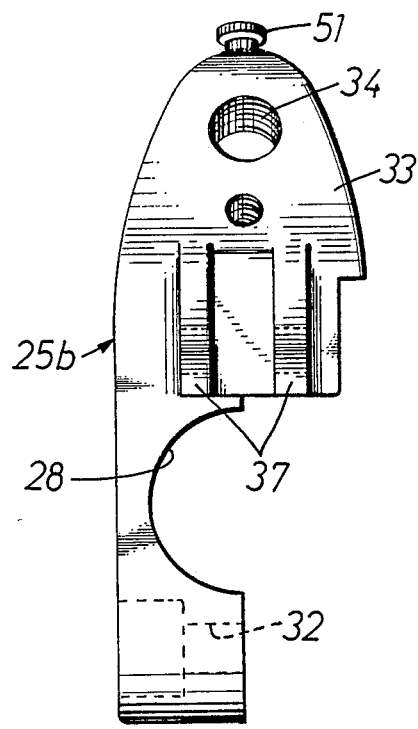
Figure 17:
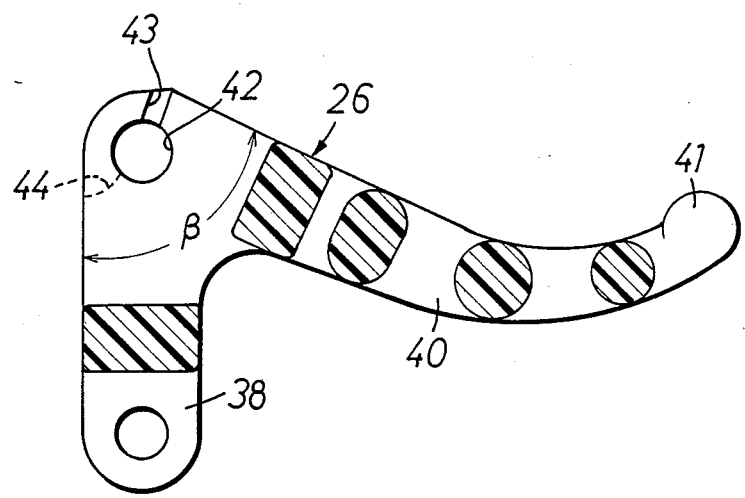

FIGS. 3 through 6 show the throttle operating device B in an enlarged elevation (side view), attached to the steering handle bar 19; FIGS. 7 through 16 show the throttle operating lever 26 in the exploded state; and FIG. 17 shows the throttle operating lever 26. The throttle operating device B will now be described in more detail with reference to FIGS. 3 through 17. The attaching bracket 25 is bisected so as to clamp the steering handle bar 19, one bracket segment 25a being a relatively small, rectangular parallelepiped, as shown in FIGS. 7 and 8, having an arcuate groove 27 formed in the middle of the inner surface thereof for intimate contact with the handle bar 19.

The other bracket segment 25b, as shown in FIGS. 9 through 16, is larger than said bracket segment 25a and has a main portion in the form of a rectangular parallelepiped corresponding to the smaller bracket segment 25a, said main portion having an arcuate groove 28 formed in the middle of the inner surface thereof in exactly opposed relation to said groove 27.

Figure 3:
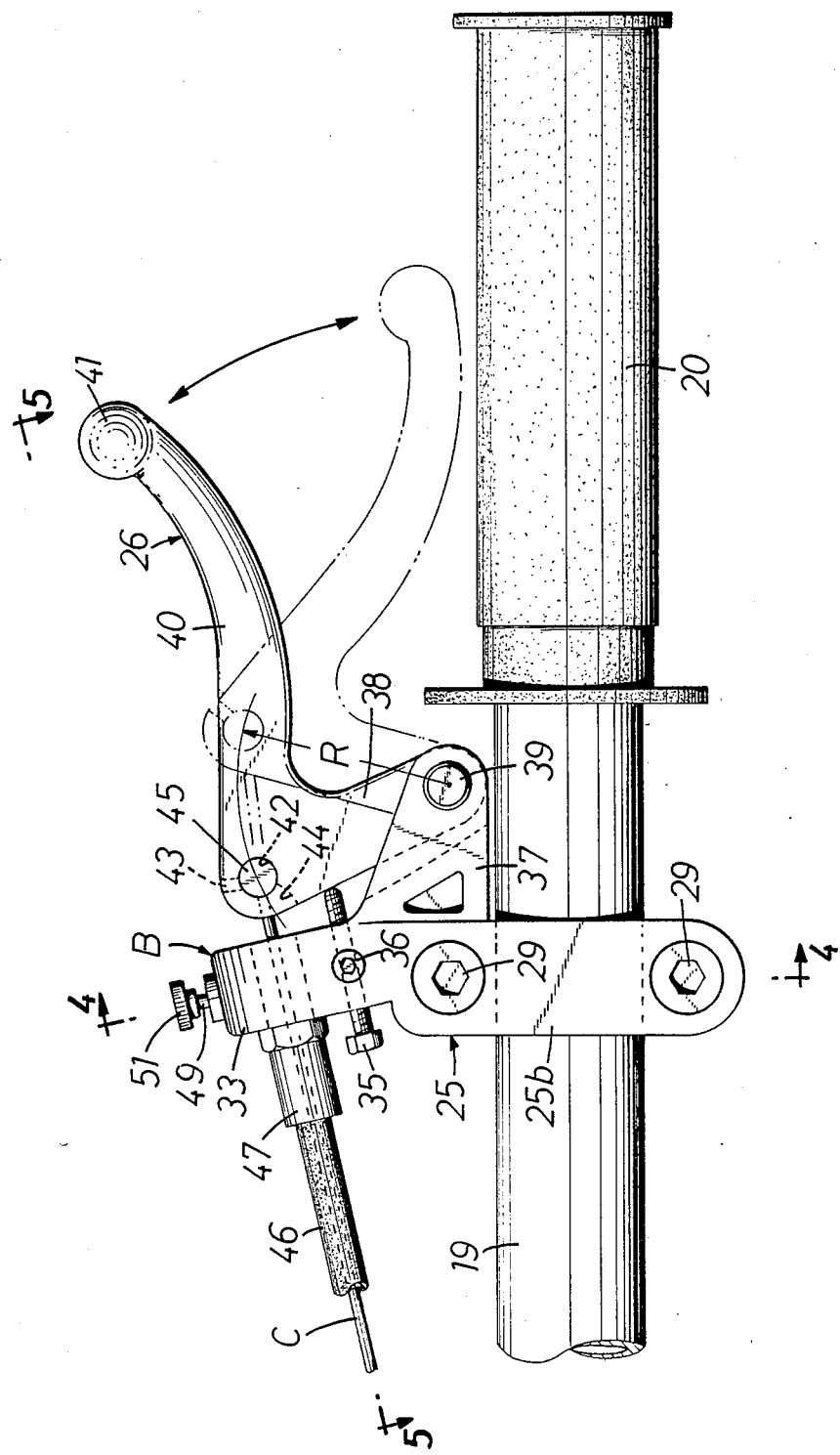
FIGS. 3 through 19 are enlarged views of a throttle operating device, FIG. 3 being a side view (elevation) showing how the throttle operating device is attached to the steering handle bar.
Figure 4:
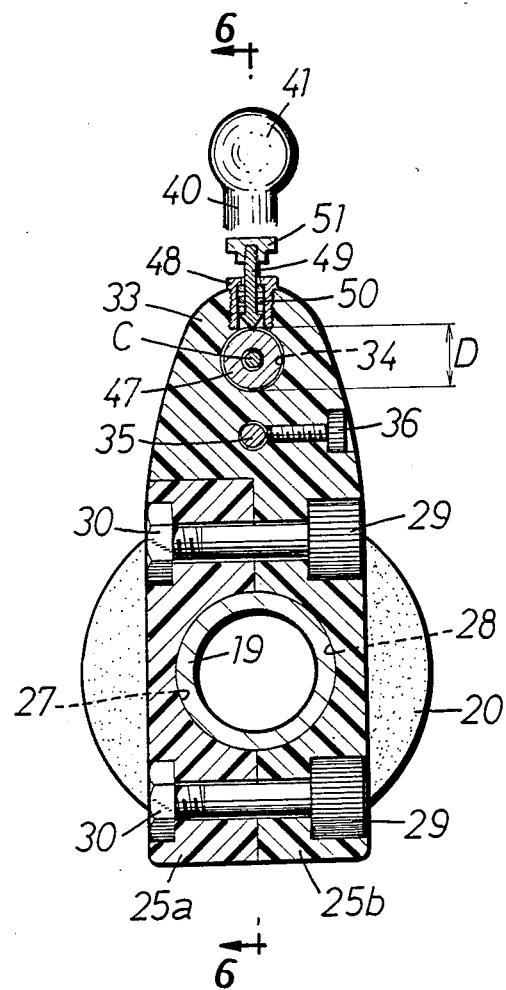

As is clear from FIGS. 3 and 4, said pair of bracket segments 25a and 25b are applied to the handle bar 19 with their grooves 27 and 28 receiving the handle bar 19 therein, whereupon they are fixed in position by a pair of upper and lower fixing bolts 29 extending horizontally therethrough and nuts 30. The numerals 31 and 32 denote a pair of upper and lower through-holes formed in the bracket segments 25a and 25b to receive the bolts 29 and nuts 30. In addition, the heads of the bolts 29 and the nuts 30 are sunk in the through-holes 31 and 32, as suggested in FIG. 4.

Figure 6:
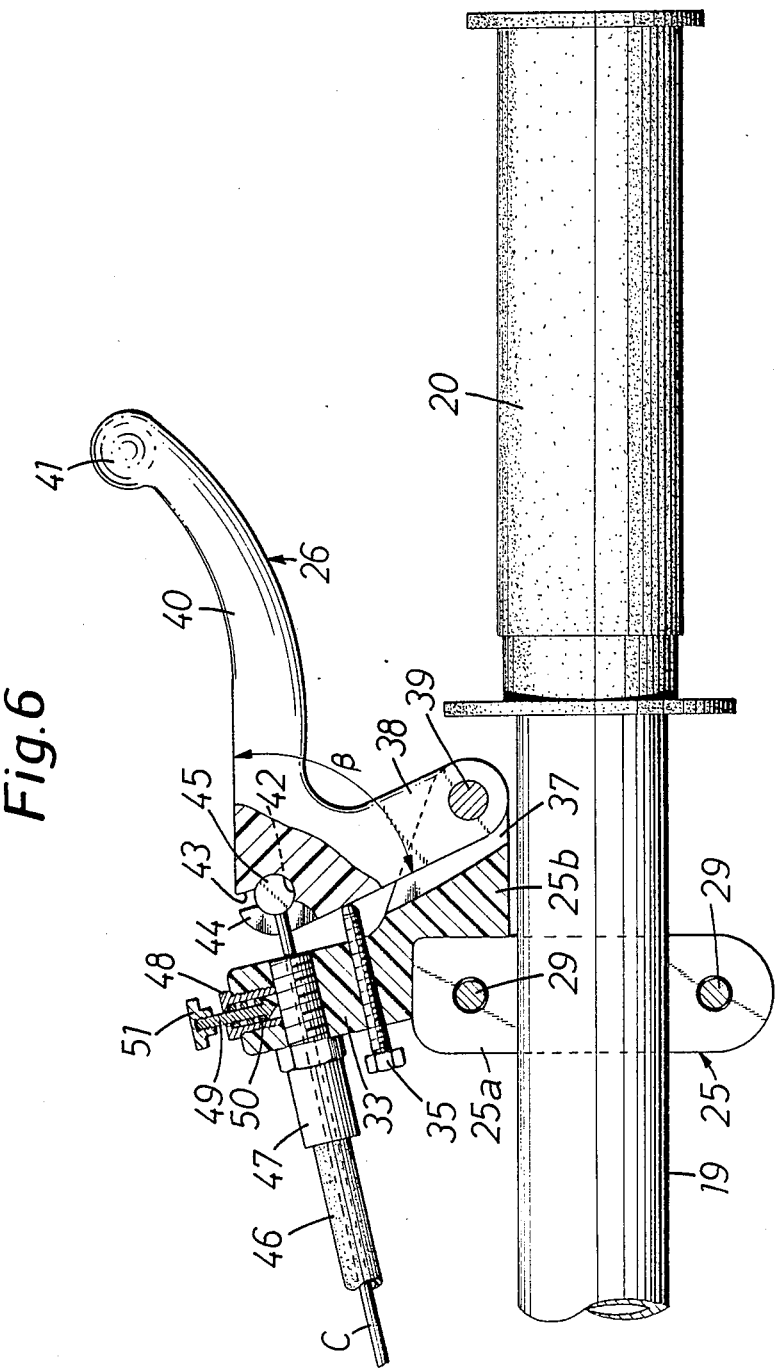

The numeral 33 denotes a support mast extending upward integrally from the main portion of the larger bracket segment 25b to cover the smaller bracket segment 25a and, as suggested in FIGS. 3 and 6, it is somewhat inclined forward as seen in side view as the upper end is reached, and it is provided at its upper end with a threaded hole 34 with a definite diameter D which opens in the longitudinal direction.

The threaded hole 34 is, of course, positioned on the split center line of the bracket segments 25a and 25b, and an adjusting bolt 35 for positioning the throttle operating lever 26 is adjustably screwed immediately below the threaded hole 34 in the support mast 33. The front end of the rear portion of the adjusting bolt 35 exposed from the support mast 33 is adapted to engage the attaching leg of the operating lever 26.

Figure 13:
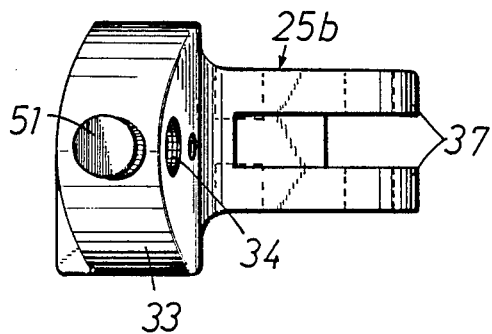
Figure 14:
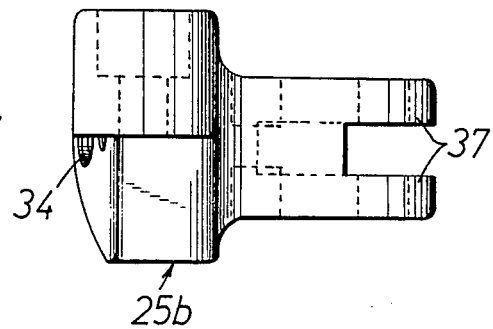
Figure 15:
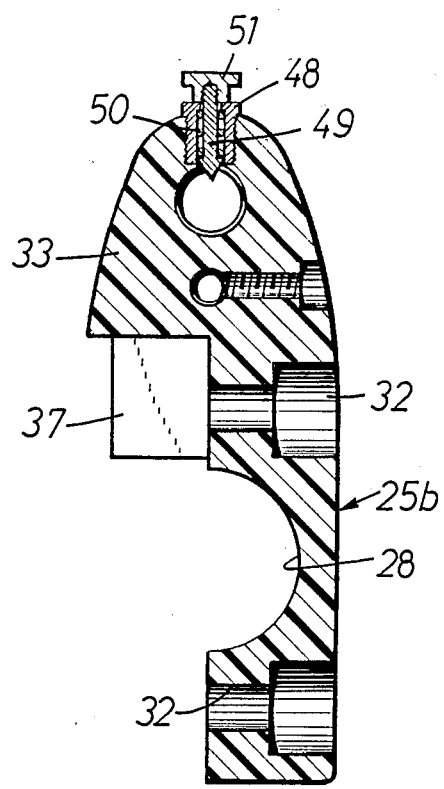
Figure 16:
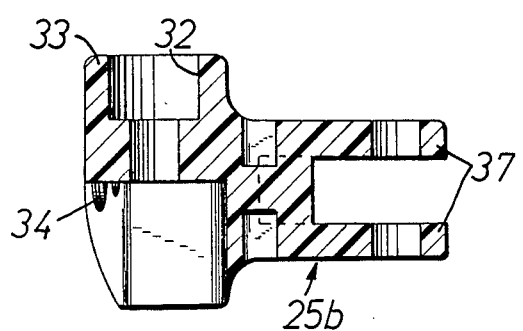

The numeral 36 denotes a positioning stopper bolt for the adjusting bolt 35, said stopper bolt being adapted to abut at its front end against the adjusting bolt 35 to fix the latter in position. The numeral 37 denotes a lever support fork integrally extending rearward from the larger bracket segment 25b having the support mast 33; as shown in FIGS. 13 and 14, it is bifurcated as seen in plan view. The support fork 37 is vertically spaced from and positioned between the adjusting bolt 35 and the grooves 27, 28 and restrains the smaller bracket segment 25a from behind.

On the other hand, the operating lever 26 is substantially in the shape of the Japanese character " ∧ " as seen in side view, such that the two sides thereof form an acute angle $\beta$, which is less than 90 degrees, one side forming a bar-like attaching bracket 38 of quadrilateral cross-section which is adapted to be inserted in the lever support fork 37 of the attaching bracket 25, whereupon it is assembled to the attaching bracket 25 by a horizontal pivot pin 39 extending through the lower portion thereof so that it can be raised and lowered. And the rotation angle range thereof (the degree of opening of the throttle valve) can be adjusted in advance by said adjusting bolt 35.

Further, the other side of the operating lever 26 forms a bar-like hand rest 40 overhanging the grip cover 20 on the handle bar 19, the cross section thereof being gradually tapered and changing from quadrilateral to circle as the rear end is reached, as shown in FIG. 17. And the front end is in the form of a relatively large sphere serving as a slippage preventing portion 41 for the hand.

Figure 18:
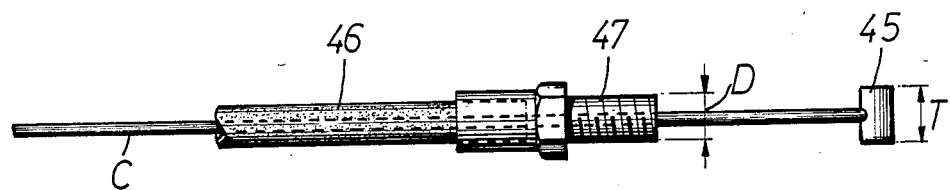

The numeral 42 denotes a locking block receiving hole formed in the bent boundary between the attaching leg 38 and the hand rest 40, communicating with a cable insertion notch 43 formed in the upper surface area and with a rotation relieving notch 44 formed in the front surface area. The character C denotes a throttle cable which, as is clear from FIG. 18, has a locking block 45 fastened to one end thereof, said locking block being received in said receiving hole 42 in said operating lever 26 so that it will not fall off, the other end being, of course, connected to the throttle valve (not shown) of the carburetor for the engine 13 mounted in the boat A.

Thus, through the turning movement of the operating lever 26, as shown in phantom lines in FIG. 3, the throttle cable C is pulled rearward while turning with a radius defined by the fixed distance between the locking block receiving hole 42 and the pivot pin 39. In this manner, the throttle valve is opened.

Since the pivot pin 39 for turning the operating lever 26 extends through the lever support fork 37 which extends rearward from an intermediate height location on the attaching bracket 25, the radius of rotation R of the operating lever 26 is much less than that of the conventional article. In addition, when the pulling force on the lever 26 is removed, the throttle cable C is, of course, automatically returned forward.

Figure 5:
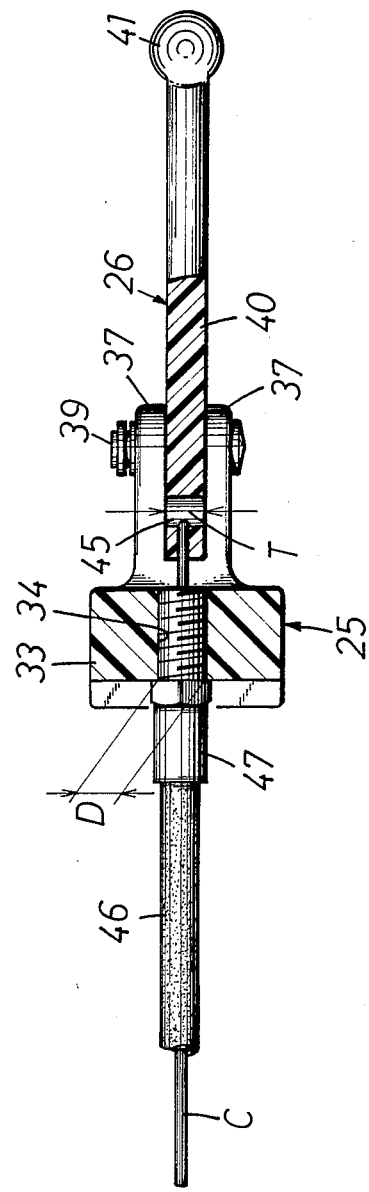

The numeral 46 denotes the flexible cover tube of the throttle cable C, fixed to the support mast 33 of the attaching bracket 25 through a mouth piece 47. The mouth piece 47 in the form of a bolt, as shown in FIG. 5, is screwed into the threaded hole 34 in the support mast 33.

In that case, the size of the locking block 45 in the throttle cable C is substantially equal to the width T of the operating lever 26, and the diameter D of the threaded hole 34 is somewhat larger than said width. Thus, the locking block 45 of the throttle cable A can be inserted into and removed from the threaded hole 34 of the support mast 33 in the longitudinal direction.

The numeral 48 denotes a spring receiving case integrally fixed to the upper end of the support mast 33 to extend vertically therefrom, with a push pin 49 inserted therein from above, said push pin having a sharp end which is urged to press against the threaded portion of said mouth piece 47 to fix the latter in position. The numeral 50 denotes a compression spring housed in the case 48, the elastic force of said spring urging the push pin 49 against the mouth piece 47. The numeral 51 denotes a thumb cap integrated with the exposed portion of the push pin 49.

Figure 19:
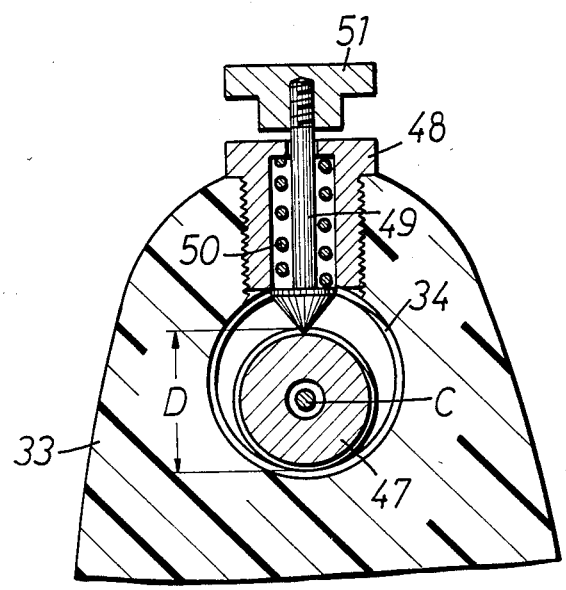

The mouth piece 47 on said cover tube 46 will sometimes be replaced by one having a diameter smaller than the diameter D of the threaded hole 34 because of different manufacturers and types of such mouth pieces and changes in the diameter of the throttle cable C. In that case, a thinner mouth piece 47 will be fixed in the threaded hole 34 without any trouble, as shown in FIG. 19; to this end, said push pin 49 is provided. Thus, the versatility of the throttle operating device B is maximized.

Reversely, in the case where a mouth piece 47 which has a diameter larger than the diameter D of said threaded hole 34 is to be used, it is possible for the user to enlarge the threaded hole 34 by an ordinary tool, such as a drill, with great ease since the attaching bracket 25 of the present invention is made from synthetic resin. Subsequently, the mouth piece 47 in the form of a bolt will be forced into the enlarged plain hole in a tapping screw fashion.

In addition, since the attaching bracket 25 is bisected into a pair of bracket segments 25a and 25b and since both the bracket 25 and the operating lever 26 are made from synthetic resin, they could be colored as desired.

According to the arrangement of the present invention described above, the attaching bracket 25 for attaching the throttle operating lever 26 to the steering handle bar 19 is bisected, consisting of a pair of opposed bracket segments 25a and 25b, and is adapted to be clamp-wise fixed on the handle bar 19 by a pair of upper and lower fixing bolts 29 extending through the bracket segments 25a and 25b and nuts 30, it can be replaced easily and efficiently without having to remove the grip cover 20 from the handle bar 19.

Figure 20:
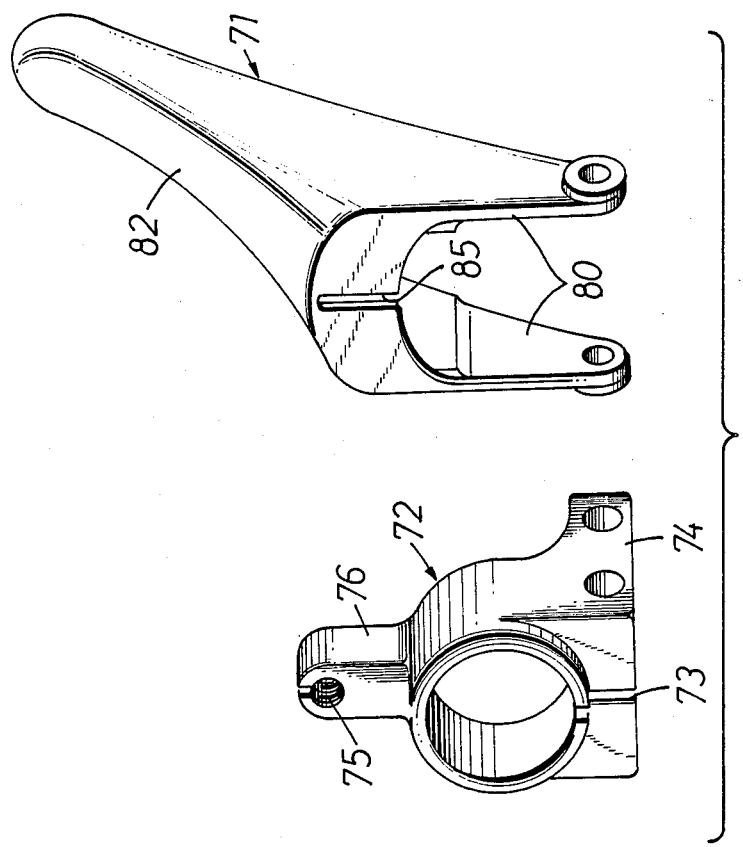
FIG. 20 is an exploded perspective view of a conventional throttle operating device.
Figure 21:
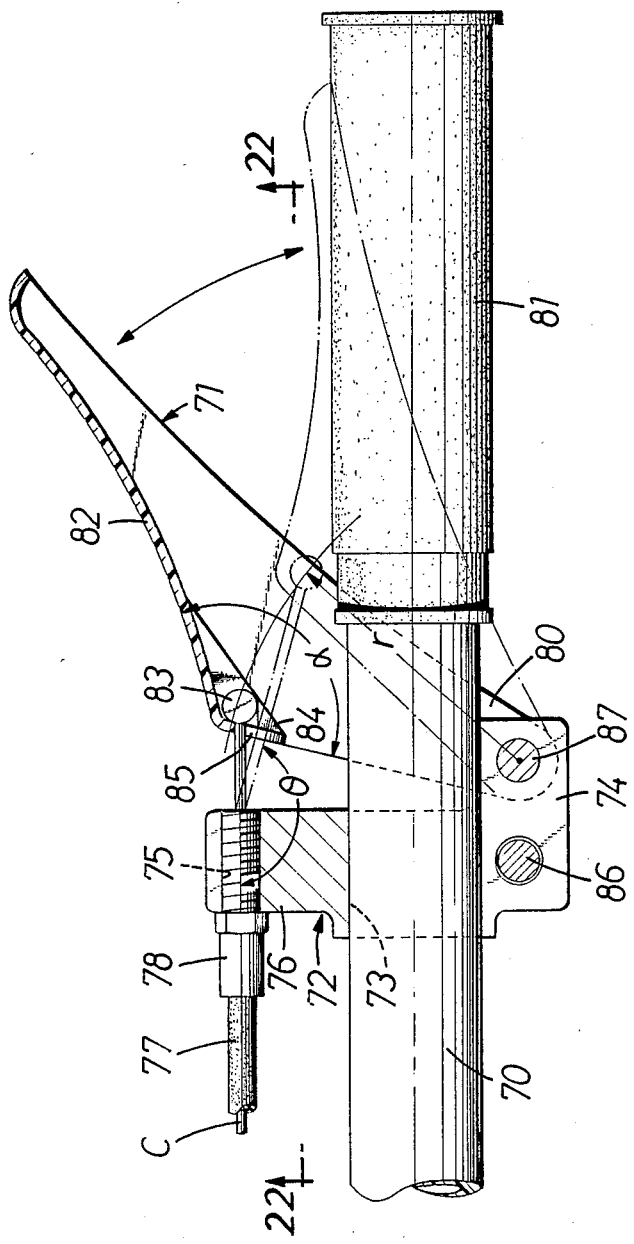
FIG. 21 is a side view, in section, corresponding to FIG. 6, showing the throttle operating device of FIG. 20 mounted on the steering handle bar.
Figure 22:
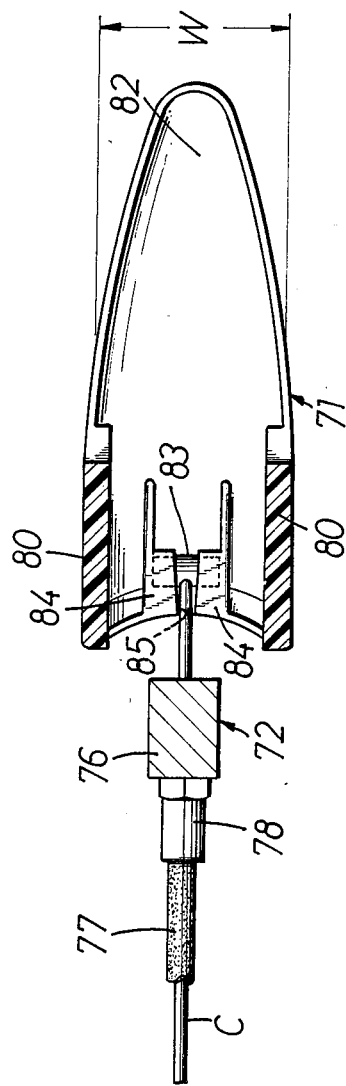
FIG. 22 s a sectional view taken along the line 22—22 in FIG. 21.

And the operating lever 26 attached to the handle bar 19 can be turned by the fingers of one hand to advance and retract the throttle cable C, thereby controlling the degree of opening of the throttle valve of the engine. The operating lever 26 is bent in the shape of the Japanese character "∧", with its attaching leg 38 and hand rest 40 forming an acute angle β therebetween, said attaching leg being inserted in the lever support fork 37 extending rearward from an intermediate height location on the attaching bracket 25, said attaching leg being then joined thereto by the pivot pin 39 extending through the front lower end portion thereof so that it can be turned for rising and lowering movements. Thus, the radius of rotation R of the operating lever 26 is greatly reduced as compared with the conventional article shown in FIGS. 20 through 22, with the result that also when the hand rest 40 of the operating lever 26 is laid flat until it abuts against the handle bar 19 (when the throttle valve is fully opened), the throttle cable C will not be excessively bent; as suggested by the chain line in FIG. 3, it will be advanced and retracted in a straight line. Thus, severe acceleration control required by a high performance engine can be effected by smooth operation on the lever.

Further, since the throttle operating lever 26 and the attaching bracket therefor are injection-molded from acetal, polycarbonate or other high strength thermoplastic synthetic resin, there is no danger of their rusting or being corroded when the boat is exposed to sea water, and can be given any desired color with ease and the utmost effect of mass production thereof can be expected. Since the hand rest 40 of the operating handle 26 is in the form of a thin bar with a small width dimension T, the fingers of one hand gripping the handle bar 19 can be fitted on the hand rest 40 of the operating lever 26 reliably without danger of slipping off. In this sense, the user is allowed to apply his driving skill to the engine effectively.

Further, if the adjusting bolt 35 for positioning the operating lever 26 is adjustably screwed from front into the support mast 33 integrally extending upward from the attaching bracket 25 and the front end of the rear portion of the adjusting bolt 35 exposed from the support mast 33 is locked to the attaching leg 38 of the operating lever 26, then the rotation angle range of the operating lever 26 (the degree of opening of the throttle valve) can be adjusted in advance. Further, even if the size of the operator's hands changes from operator to operator, anyone can fit his fingers on the hand rest 40 of the operating lever 26 reliably and stably; thus, the invention is superior in operability.

If the push pin 49 of the mouth piece 47 is inserted from above into the support mast 33 of the attaching bracket 25 and an elastic force is applied to the push pin 49, then even if the mouth piece 47 is replaced by a thinner one as shown in FIG. 19, it is possible to hold the thinner mouth piece 47 in the threaded hole 34 of the support mast 33 stably and reliably.

And in the case where the mouth piece 47 is replaced by a thicker one, since the attaching bracket 25 of the invention is made molded from synthetic resin as described above, it is easy to perform drilling so as to open the threaded hole 34 into the support mast 33 to receive the thicker mouth piece 47; thus, versatility with respect to changes in the thickness of the mouth piece 47 can be further improved.

What is claimed is:

1. A throttle operating device for jet-propelled small-sized boats comprising an attaching bracket (25) integrally fixed to a steering handle bar (19) of a boat body A, and a throttle operating lever (26) pivotally connected to said attaching bracket through a pivot pin so that said operating lever can be raised and lowered, wherein the turning operation of the operating lever (26) advances and retracts a throttle cable (C) so as to control the opening and closing of a throttle valve of an engine (13) mounted on the boat body A, said throttle operating device being characterized in that:

said attaching bracket (25) is bisected into a pair of bracket segments (25a, 25b) injection-molded from high strength thermoplastic resin, said bracket segments (25a, 25b) being clamp-wise fixed to the handle bar (19) by a pair of upper and lower fixing bolts (29) extending through said bracket segments (25a, 25b) and nuts (30), a support mast (33) integrally extending upward from one bracket segment (25b) is formed with a longitudinally extending threaded through-hole (34) for receiving a mouth piece (47) adapted to hold a cover tube (46) for the throttle cable (C), a lever support fork (37) corresponding to the operating lever (26) integrally extends rearward from an intermediate height location on the bracket segment (25b) having the support mast (33), the whole of said operating lever (26) is injection-molded from the same synthetic resin as that for the attaching bracket (25) so that said operating lever is substantially in the shape of the Japanese character "∧" as seen in side view, one side thereof serving as an attaching leg (38) turnably connected to the lever support fork (37) of the attaching bracket (25) through said pivot pin (39) parallel to said fixing bolts (29) so that said operating lever can be raised and lowered, the other side of the operating lever (26) serves as a hand rest (40) and is disposed above and opposed to a grip cover (20) on the handle bar (19), the bent boundary between the hand rest (40) and the attaching leg (38) is formed with a hole (42) for receiving a locking block(45) fastened to the end of the throttle cable (C).

2. A throttle operating device for jet-propelled small-sized boats as set forth in claim 1, characterized in that an adjusting bolt (35) for positioning the throttle operating lever (26) is adjustably screwed from front into the support mast (33) of the attaching bracket (25), and the front end of the rear portion thereof exposed from the support mast (33) is locked to the attaching leg (38) of the operating lever, thereby making it possible to adjust the rotation angle range of the operating lever (26).

3. A throttle operating device for jet-propelled small-sized boats as set forth in claim 2, characterized in that the whole of the throttle operating lever (26) is in the shape of the Japanese character "∧" as seen in side view with its attaching leg (38) and hand rest (40) forming an acute angle (β), which is less than 90 degrees, said hand rest (40) is in the form of a bar tapering toward its rear end, the cross-sectional shape smoothly changing from quadrilateral to circle, the front end of the rear portion of the hand rest (40) spherically extends to serve as a slip-off preventing portion (41) for the associated operator's hand.

* * * * *